United States Patent
Mita (10) Patent No.: US 9,755,552 B2
(45) Date of Patent: Sep. 5, 2017

(54) FREQUENCY CONVERTER

(71) Applicant: Hitachi Metals, Ltd., Tokyo (JP)

(72) Inventor: Masahiro Mita, Takasaki (JP)

(73) Assignee: Hitachi Metals, Ltd., Tokyo (JP)

(*) Notice: Subject to any disclaimer, the term of this patent is extended or adjusted under 35 U.S.C. 154(b) by 457 days.

(21) Appl. No.: 14/388,199

(22) PCT Filed: Mar. 22, 2013

(86) PCT No.: PCT/JP2013/058209
§ 371 (c)(1),
(2) Date: Sep. 25, 2014

(87) PCT Pub. No.: WO2013/146560
PCT Pub. Date: Oct. 3, 2013

(65) Prior Publication Data
US 2015/0043264 A1     Feb. 12, 2015

(30) Foreign Application Priority Data

Mar. 27, 2012    (JP) ................................ 2012-072002

(51) Int. Cl.
*H02M 11/00*     (2006.01)
*H01F 38/18*     (2006.01)
(Continued)

(52) U.S. Cl.
CPC ............ *H02M 11/00* (2013.01); *H01F 38/18* (2013.01); *H02M 5/16* (2013.01); *H02M 5/38* (2013.01)

(58) Field of Classification Search
CPC ......... H01F 38/18; H02M 11/00; H02M 5/16; H02M 5/38
(Continued)

(56) References Cited

U.S. PATENT DOCUMENTS

| 3,343,054 A | 9/1967 | Kusko |
| 3,445,701 A * | 5/1969 | Harris ..................... H02K 47/24 |
| | | 310/160 |

(Continued)

FOREIGN PATENT DOCUMENTS

| CN | 101841280 A | 9/2010 |
| CN | 201994824 U | 9/2011 |

(Continued)

OTHER PUBLICATIONS

Ikeda et al., "A way to Improve Efficiency of Permanent-Magnetic Gears", Journal of Magnetics Society of Japan (2009), 33(2):130-134.

*Primary Examiner* — Alex W Mok
(74) *Attorney, Agent, or Firm* — Rudy J. Ng; Bret E. Field; Bozicevic, Field & Francis LLP (57) ABSTRACT

A frequency converter includes: a primary winding 12 in which a plurality of windings on which a polyphase alternating voltage is applied are arranged periodically along a particular direction; a secondary winding 22 which is magnetically coupled to the primary winding 12 and in which a plurality of windings are arranged along the particular direction with a repetition period different from the primary winding 12; and a frequency modulation part 3 which is arranged on a magnetic path between the primary winding 12 and the secondary winding 22 and in which a plurality of magnetic materials 31 are arranged periodically. Then, the pitch of the plurality of magnetic materials 31 and the winding arrangement period of the primary winding 12 and the secondary winding 22 are different from each other so that an alternating voltage having a frequency different from the frequency of the polyphase alternating voltage is induced in the secondary winding 22.

14 Claims, 8 Drawing Sheets

(51) Int. Cl.
*H02M 5/16* (2006.01)
*H02M 5/38* (2006.01)

(58) Field of Classification Search
USPC .......................................................... 310/160
See application file for complete search history.

(56) References Cited

U.S. PATENT DOCUMENTS

| | | | | |
|---|---|---|---|---|
| 3,777,296 A * | 12/1973 | Ohyama | ................. | H01F 29/12 336/120 |
| 4,039,910 A * | 8/1977 | Chirgwin | ............... | H02K 47/22 191/11 |
| 4,160,925 A * | 7/1979 | Ishikawa | ................. | H02M 5/32 310/160 |
| 4,390,941 A | 6/1983 | Benecke et al. | | |
| 5,633,555 A * | 5/1997 | Ackermann | ......... | H02K 49/102 310/103 |
| 7,336,865 B2 * | 2/2008 | Mita | ..................... | G02B 6/3508 385/16 |
| 8,063,526 B2 * | 11/2011 | Bright | .................. | H02K 49/102 310/103 |
| 8,575,804 B2 * | 11/2013 | Nakatsugawa | ...... | H02K 49/102 310/103 |
| 2002/0057027 A1 | 5/2002 | McLaren et al. | | |
| 2004/0108781 A1 * | 6/2004 | Razzell | .................... | H02K 7/11 310/112 |
| 2008/0030090 A1 * | 2/2008 | Abe | ....................... | B60K 17/12 310/103 |
| 2008/0149445 A1 * | 6/2008 | Kern | ...................... | F01D 15/10 192/3.56 |
| 2011/0012458 A1 * | 1/2011 | Atallah | ................. | H02K 49/102 310/103 |
| 2011/0037333 A1 * | 2/2011 | Atallah | .................. | H02K 51/00 310/98 |
| 2011/0057456 A1 * | 3/2011 | Atallah | ................. | H02K 49/102 290/1 C |
| 2011/0121674 A1 * | 5/2011 | Bright | .................. | H02K 49/102 310/103 |
| 2011/0127869 A1 * | 6/2011 | Atallah | .................. | H02K 49/06 310/94 |
| 2011/0156518 A1 * | 6/2011 | Bright | .................. | H02K 19/106 310/103 |
| 2012/0194021 A1 * | 8/2012 | Nakatsugawa | ...... | H02K 49/102 310/103 |
| 2013/0002075 A1 * | 1/2013 | Edwards | ................ | H02K 49/06 310/103 |
| 2013/0002076 A1 * | 1/2013 | Iwasaki | ................ | H02K 49/102 310/103 |
| 2013/0127278 A1 * | 5/2013 | Mita | ..................... | H02K 49/108 310/103 |
| 2013/0320795 A1 * | 12/2013 | Enomoto | ............... | H02K 49/10 310/103 |
| 2014/0167546 A1 * | 6/2014 | Sutani | .................. | H02K 49/102 310/103 |

FOREIGN PATENT DOCUMENTS

| | | | | |
|---|---|---|---|---|
| DE | EP 1843454 A1 * | 10/2007 | .......... | H02K 49/102 |
| JP | S33-001171 | 2/1958 | | |
| JP | S55133679 | 10/1980 | | |
| JP | H10248108 | 9/1998 | | |
| JP | 2008048550 | 2/2008 | | |
| WO | WO9716885 A1 | 5/1997 | | |

* cited by examiner

FREQUENCY CONVERTER

This application is the national phase under 35 U.S.C. §371 of PCT International Application No. PCT/JP2013/58209 which has an International filing date of Mar. 22, 2013 and designated the United States of America.

FIELD

The present invention relates to a frequency converter converting the frequency of a polyphase alternating current. In particular, the present invention relates to a frequency converter in which an alternating magnetic field is generated by a polyphase alternating current, then the spatial frequency of the generated alternating magnetic field is modulated by a magnetic material row, and then the modulated alternating magnetic field induces an alternating current having a different frequency from the polyphase alternating current so that the frequency of an alternating current is converted.

BACKGROUND

In electric power transfer, when frequency conversion is to be performed on an alternating current, in a frequency converter, an alternating current is once converted into a direct current by a smoothing circuit employing a diode, an inductor, a capacitor, and the like. Then, in the frequency converter, switching is performed on the converted direct current by a semiconductor switching element so that conversion into an alternating current of desired alternating-current frequency is performed anew. For example, the frequency converter performs frequency conversion between a 50-Hz alternating current in eastern Japan and a 60-Hz alternating current in western Japan, frequency conversion between an alternating current of 400-Hz power generation frequency in the inside of an aircraft and a 50- to 60-Hz alternating current from an outlet, or the like. As the semiconductor switching element, a thyristor, a transistor, an FET, an IGBT, an SIT, or the like is employed. Further, another technique is also known that is referred to as a cycloconverter in which frequency conversion of an alternating current is performed directly by high-frequency switching. However, also in this technique, a semiconductor switching element is employed similarly.

SUMMARY

However, in the frequency converter according to the conventional art employing a semiconductor switching element, the following problems have been pointed out.

A large number of semiconductor devices and electronic control circuits are employed. This causes a problem of low reliability.

Further, a problem is present that electromagnetic noise is generated by switching. The electromagnetic noise has a possibility of causing undesired operation in the electronic devices in the surroundings. In particular, in the inside of an aircraft, influence to navigation equipment is a concern. When noise countermeasure components are employed such that electromagnetic noise is not be propagated and radiated, this causes an undesired increase in the weight and the number of components.

Further, an electric current is converted from an alternating current to a direct current and then converted again from the direct current to an alternating current. That is, two conversion steps consisting of AC-DC conversion and DC-AC conversion are performed and hence cause a loss. Further, high-frequency switching by a cycloconverter causes a loss. Thus, the frequency converter according to the conventional art has a problem of low efficiency in the frequency conversion.

The present invention has been devised in view of this situation. An object thereof is to provide a frequency converter having low electromagnetic noise, high reliability, and a high efficiency.

The frequency converter according to the present invention is characterized by including: a first winding in which a plurality of windings on which a polyphase alternating voltage is applied are arranged approximately with equal pitch along a particular direction; a second winding which is magnetically coupled to the first winding and in which a plurality of windings are arranged along the particular direction with different pitch from the first winding; and a magnetic material row which is arranged on a magnetic path between the first and the second winding magnetically coupled to each other and in which a plurality of magnetic materials are arranged approximately with equal pitch along the particular direction, wherein a number of the plurality of magnetic materials in the particular direction and a number of repeated patterns of the plurality of windings of the first and the second winding are different from each other so that an alternating voltage having a frequency different from the frequency of the polyphase alternating voltage is induced in the second winding.

In the present invention, the first winding on which the polyphase alternating current is applied generates an alternating magnetic field. The spatial frequency of the alternating magnetic field is modulated by the magnetic material row. An alternating current is induced in the second winding by the modulated alternating magnetic field. The number of the plurality of magnetic materials in the particular direction and the number of repeated patterns of the plurality of windings of the first and the second winding are different from each other. Thus, the frequency of the alternating current induced in the second winding and the frequency of the polyphase alternating current applied on the first winding are different from each other. That is, the frequency of the alternating current is converted.

In the present invention, frequency conversion of an alternating current is allowed to be performed without using a semiconductor switching element and an electronic control circuit. Thus, high reliability is obtained. Further, switching noise is not generated. Further, an improved frequency conversion efficiency is obtained in comparison with a method that frequency conversion is performed by AC-DC conversion and DC-AC conversion.

The frequency converter according to the present invention is characterized in that the first and the second winding and the magnetic material row satisfy the following formula.

$$P = L \pm H$$

where

P: number of the plurality of magnetic materials in the particular direction,

L: number of repeated patterns of the plurality of windings of the first winding in the particular direction, and H: number of repeated patterns of the plurality of windings of the second winding in the particular direction.

In the present invention, the modulated alternating magnetic field contains a plurality of frequency components. Then, when the relation $P = L \pm H$ is satisfied, the alternating magnetic field of the main frequency component agrees with the number of repeated patterns of the plurality of windings of the second winding. Thus, the frequency conversion efficiency of the alternating current is allowed to be improved further.

The frequency converter according to the present invention is characterized by including: a first winding in which a plurality of windings on which a polyphase alternating voltage is applied are arranged approximately with equal pitch along a particular direction; a magnet row which is magnetically coupled to the first winding and in which a plurality of magnetic pole pairs are arranged along the particular direction with different pitch from the first winding; a magnetic material row which is arranged on a magnetic path between the first winding and the magnet row magnetically coupled to each other and in which a plurality of magnetic materials are arranged approximately with equal pitch along the particular direction; and a second winding in which a plurality of windings are arranged between the plurality of magnetic materials or alternatively wound around each magnetic material, wherein a number of the plurality of magnetic materials in the particular direction is different from a number of repeated patterns of the plurality of windings of the first winding and a number of the magnet pairs so that an alternating voltage having a frequency different from the frequency of the polyphase alternating voltage is induced in the second winding.

In the present invention, the first winding on which the polyphase alternating current is applied generates an alternating magnetic field. The spatial frequency of the alternating magnetic field is modulated by the magnetic material row. Further, the magnetic field of the magnet row is also modulated by the magnetic material row. An alternating current is induced in the second winding by each modulated magnetic field. The number of the plurality of magnetic materials in the particular direction and the number of repeated patterns of the plurality of windings of the first and the second winding are different from each other. Thus, the frequency of the alternating current induced in the second winding and the frequency of the polyphase alternating current applied on the first winding are different from each other. That is, the frequency of the alternating current is converted.

In the present invention, frequency conversion of an alternating current is allowed to be performed without using a semiconductor switching element and an electronic control circuit. Thus, high reliability is obtained. Further, switching noise is not generated. Further, an improved frequency conversion efficiency is obtained in comparison with a method that frequency conversion is performed by AC-DC conversion and DC-AC conversion.

The frequency converter according to the present invention is characterized in that the first winding, the magnet row, and the magnetic material row satisfy the following formula.

$$P = L \pm H$$

where

P: number of the plurality of magnetic materials in the particular direction,

L: number of repeated patterns of the plurality of windings of the first winding in the particular direction, and H: number of the magnetic pole pairs of the magnet row in the particular direction.

In the present invention, the modulated alternating magnetic field contains a plurality of frequency components. Then, when the relation $P = L \pm H$ is satisfied, the alternating magnetic field of the main frequency component agrees with the number of repeated patterns of the plurality of windings of the second winding. Thus, the frequency conversion efficiency of the alternating current is allowed to be improved further.

The frequency converter according to the present invention is characterized by including: a cylindrical holding member holding the magnetic material row, wherein the particular direction is a circumferential direction of the holding member and the first winding and the second winding are arranged in a manner such as to generate a periodic magnetic field along the circumferential direction.

The frequency converter according to the present invention is characterized in that the first winding and the second winding are arranged in such a manner that a winding axis is directed to a center of the holding member.

In the present invention, the frequency converter is allowed to be constructed in a cylindrical shape.

The frequency converter according to the present invention is characterized by including: a disk-shaped holding member holding the magnetic material row, wherein the particular direction is a circumferential direction of the holding member and the first winding and the second winding are arranged in a manner such as to generate a periodic magnetic field along the circumferential direction.

The frequency converter according to the present invention is characterized in that the first winding and the second winding are arranged in such a manner that a winding axis is approximately perpendicular to the holding member.

In the present invention, the frequency converter is allowed to be constructed in a disk shape.

Effect of the Invention

According to the present invention frequency conversion in which high reliability is obtained, electromagnetic noise is low, and a high efficiency is obtained is allowed to be realized.

The above and further objects and features will more fully be apparent from the following detailed description with accompanying drawings.

DETAILED DESCRIPTION OF NON-LIMITING EXAMPLE EMBODIMENTS

The present invention is described below in detail with reference to the drawings illustrating an embodiment.

Figure 1:
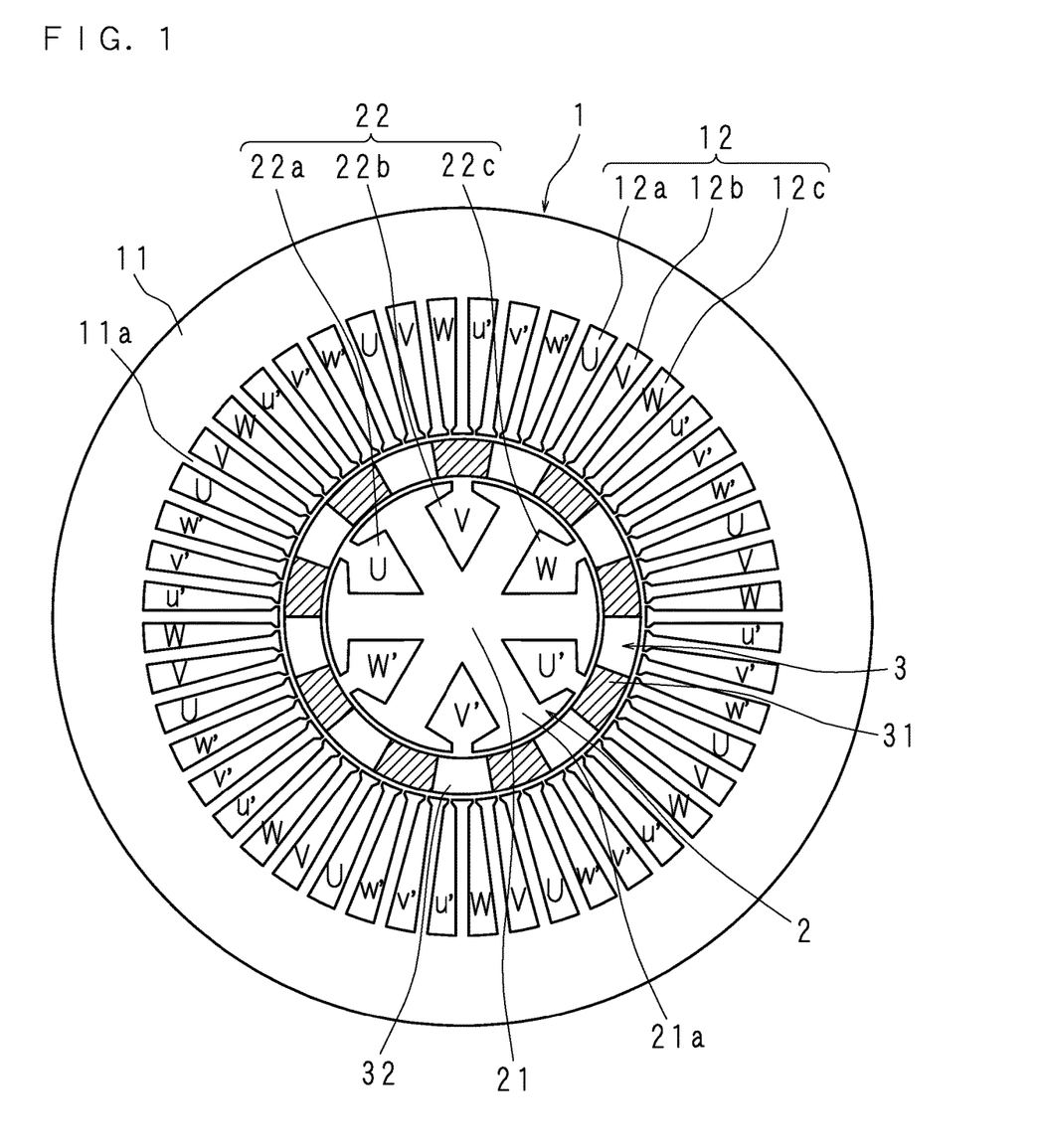
FIG. 1 is an axial sectional view illustrating an exemplary configuration of a frequency converter according to the present embodiment.

FIG. 1 is an axial sectional view illustrating an exemplary configuration of a frequency converter according to the present embodiment. The frequency converter according to the present embodiment includes: an alternating magnetic field generation part 1 which has a cylindrical shape and on which a three-phase alternating voltage is applied so that an alternating magnetic field is generated; and an alternating current induction part 2 which has a cylindrical shape and arranged in a coaxial manner with a gap in the inner side of the alternating magnetic field generation part 1 and which outputs an alternating voltage induced by the alternating magnetic field. The frequency converter includes a cylindrical frequency modulation part 3 arranged in a coaxial manner with a gap between the alternating magnetic field generation part 1 and the alternating current induction part 2 and modulating the spatial frequency of the alternating magnetic field.

The alternating magnetic field generation part 1 includes a cylindrical outer yoke 11 composed of a magnetic material. In the inner peripheral surface of the outer yoke 11, a plurality of teeth 11a protruding in the center direction are provided along the circumferential direction at approximately regular intervals. For example, the outer yoke 11 is constructed by stacking thin silicon steel plates. A primary winding 12 on which a three-phase alternating voltage is applied is inserted into each slot between the individual teeth 11a. For example, the primary winding 12 includes: a winding 12a on which a U-phase alternating current is applied; a winding 12b on which a V-phase alternating current is applied; and a winding 12c on which a W-phase alternating current is applied. Distributed winding is employed in each of the windings 12a, 12b, and 12c. The winding arrangement period L of the primary winding 12, that is, the number of repeated patterns of each of the windings 12a, 12b, and 12c arranged along the circumferential direction of the outer yoke 11, is 8 for example.

The alternating current induction part 2 includes an inner yoke 21 composed of a magnetic material. The inner yoke 21 includes a plurality of teeth 21a protruding radially from the center part. For example, the inner yoke 21 is constructed by stacking thin silicon steel plates. A secondary winding 22 in which an alternating voltage is induced by the alternating magnetic field is inserted into each slot between the individual teeth 21a. For example, the secondary winding 22 includes: a winding 22a in which a U-phase alternating current is induced; a winding 22b in which a V-phase alternating current is induced; and a winding 22c in which a W-phase alternating current is induced. Distributed winding is employed in each of the windings 22a, 22b, and 22c. The winding arrangement period H of the secondary winding 22, that is, the number of repeated patterns of each of the windings 22a, 22b, and 22c arranged along the circumferential direction of the inner yoke 21, is 1 for example. This is different from the winding arrangement period L of the primary winding 12.

The frequency modulation part 3 has a cylindrical shape and is arranged in a coaxial manner between the alternating current induction part 2 and the alternating magnetic field generation part 1. The frequency modulation part 3 includes: a plurality of magnetic materials 31 arranged in the circumferential direction approximately with equal pitch; and a holding member 32 holding the magnetic materials 31. The number of magnetic materials 31 is equal to the sum of the winding arrangement period L of the primary winding 12 and the winding arrangement period H of the secondary winding 22. The magnetic material 31 has a shape obtained by cutting a part of a cylinder along the longitudinal direction. Then, the holding member 32 holds the individual magnetic materials 31 so that the entirety forms a cylindrical shape. An alternating magnetic field generated by the alternating magnetic field generation part 1 and containing a modulated harmonic component intersects with the frequency modulation part 3 along the radial direction. For example, the magnetic material 31 may be constructed from: a magnetic metal; a laminated steel plate composed of a plurality of laminated magnetic plates; or a soft magnetic material fabricated from green compact of magnetic powder or the like. In particular, as a construction material for the magnetic materials 31, a laminated steel plate is preferable since the eddy current loss is allowed to be suppressed.

The operation of the frequency converter having this configuration is described below. When a U-phase alternating current, a V-phase alternating current, and a W-phase alternating current are applied respectively on the windings 12a, 12b, and 12c of the primary winding 12, a periodic alternating magnetic field revolving in the circumferential direction is generated in the inner side of the outer yoke 11. The revolving alternating magnetic field is similar to a magnetic field generated when a rotator of a magnetic gear wheel in which L pairs of magnetic poles are arranged in the circumferential direction like a magnetic gear wheel described in an academic journal (see Tetsuya Ikeda, Kenji Nakamura, and Osamu Ichinokura, "A consideration on efficiency improvement for permanent magnet type magnetic gear wheel", Journal of the Magnetics Society of Japan, 2009, Vol. 33, No. 2, pp. 130-134) is revolved. That is, the operation that a three-phase alternating current is applied on the primary winding 12 is equivalent to that the rotator is revolved.

The frequency of the alternating magnetic field generated by the primary winding 12 is modulated by magnetic interaction with the magnetic materials 31 of the frequency modulation part 3. In the modulated alternating magnetic field, a frequency (P+L) component, a frequency (P−L) component, and the like are contained as main components (see Tetsuya Ikeda, Kenji Nakamura, and Osamu Ichinokura, "A consideration on efficiency improvement for permanent magnet type magnetic gear wheel", Journal of the Magnetics Society of Japan, 2009, Vol. 33, No. 2, pp. 130-134). The modulated alternating magnetic field acts on the secondary winding 22 so that an alternating voltage is induced in the secondary winding 22. The winding arrangement period of the secondary winding 22 satisfies the following formula (1). Thus, the frequency component (P−L) of the modulated alternating magnetic field agrees with the winding arrangement period H=P−L of the secondary winding 22 and hence an alternating current is efficiently induced in the secondary winding 22. The ratio of the frequencies of the alternating currents concerning frequency conversion is H to L.

$$P = L + H \qquad (1)$$

where

P: arrangement period of the plurality of magnetic materials 31 in the circumferential direction, L: winding arrangement period of the primary winding 12 in the circumferential direction, and H: winding arrangement period of the secondary winding 22 in the circumferential direction.

The frequency converter according to the embodiment is constructed from windings (the primary winding 12 and the secondary winding 22) and a yoke (the frequency modulation part 3) and hence free from a steep change in the voltage and the current. Further, no movable part is employed. Thus, frequency conversion in which high-frequency electromagnetic noise is low and high reliability is obtained is allowed to be realized.

Further, since the above-mentioned formula (1) is satisfied, the main component of the modulated alternating magnetic field acts on the secondary winding 22 so that the frequency conversion efficiency of the alternating current is allowed to be improved further.

Here, in the present embodiment, the above-mentioned formula (1) has been illustrated with using the arrangement period and the winding arrangement period of the magnetic materials 31 denoted by L and H. However, employable configurations are not limited to this and the configuration may be such that the following formula (2) is satisfied.

$$(2m-1)P = L \pm (2n-1)H \qquad (2)$$

where m and n are natural numbers.

Modification 1

Figure 2:
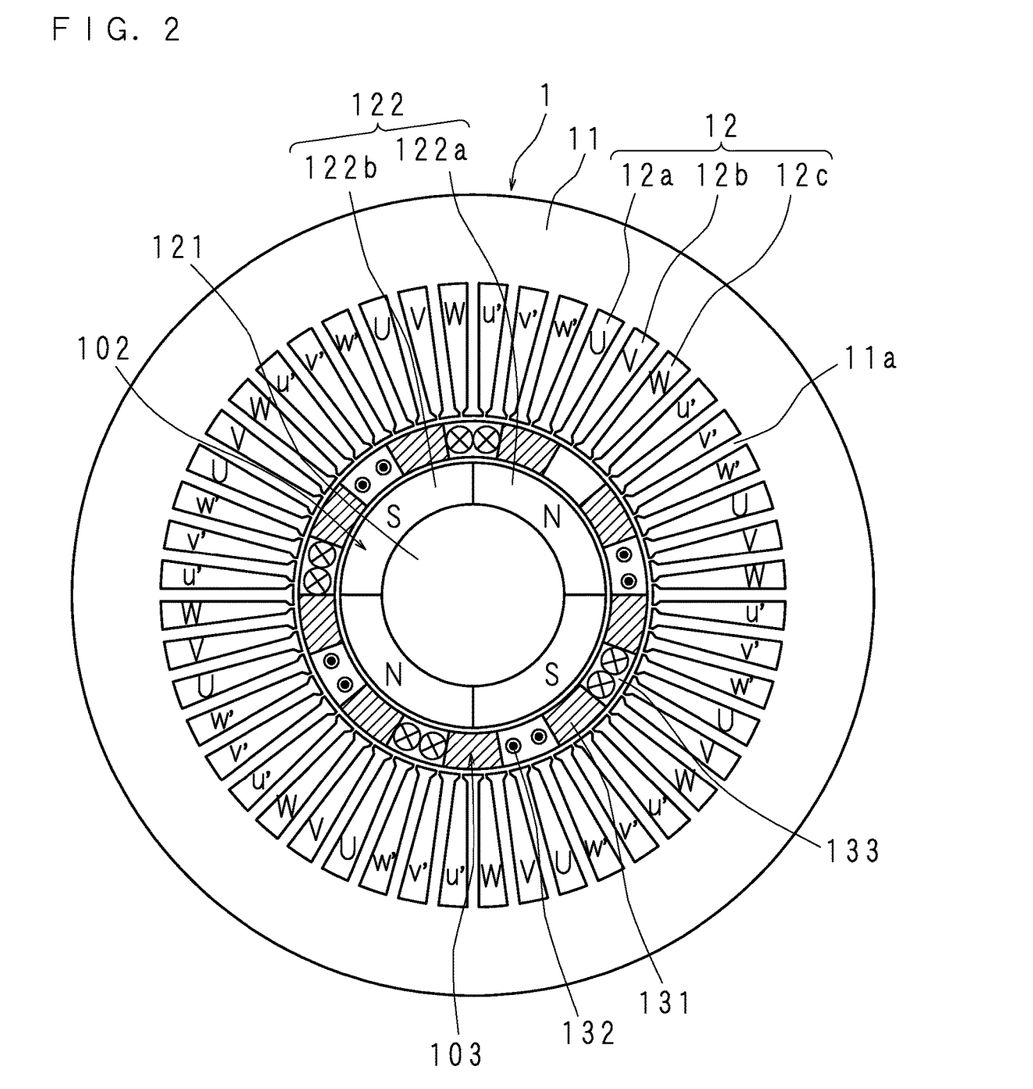
FIG. 2 is an axial sectional view illustrating an exemplary configuration of a frequency converter according to modification 1.

A frequency converter according to modification 1 has a different configuration concerning the alternating current induction part 2 according to the embodiment. Thus, the following description is given by focusing attention mainly on this difference.

FIG. 2 is an axial sectional view illustrating an exemplary configuration of the frequency converter according to modification. The frequency converter according to modification 1 includes: an alternating magnetic field generation part 1 similar to that in Embodiment 1; a cylindrical magnet row 102 arranged in a coaxial manner with a gap in the inner side of the alternating magnetic field generation part 1; a cylindrical frequency modulation part 103 arranged in a coaxial manner with a gap between the alternating magnetic field generation part 1 and the magnet row 102 and modulating the spatial frequency of the alternating magnetic field; and a secondary winding 132 provided in the frequency modulation part 103 and outputting an alternating voltage induced by the alternating magnetic field.

The magnet row 102 includes an inner columnar part 121. In the outer peripheral surface of the inner columnar part 121, two magnetic pole pairs 122 each including a magnet 122a whose outer peripheral surface side is of N pole and a magnet 122b whose outer peripheral surface side is of S pole which are magnetized in the thickness direction are arranged along the circumferential direction at approximately regular intervals.

Similarly to the embodiment, the frequency modulation part 103 has a cylindrical shape and is arranged in a coaxial manner between the alternating magnetic field generation part 1 and the magnet row 102. The frequency modulation part 103 includes: a plurality of magnetic materials 131 arranged in the circumferential direction approximately with equal pitch; and a holding member 133 holding the magnetic materials 131.

The secondary winding 132 is arranged between the magnetic materials 131 of the frequency modulation part 103 or alternatively wound around each magnetic material 131. That is, the configuration is such that the winding arrangement period of the secondary winding 132 agrees with the arrangement period of the magnetic materials 131.

The operation of the frequency converter having this configuration is described below. When a three-phase alternating voltage is applied on the primary winding 12, as described in the embodiment, a periodic alternating magnetic field revolving in the circumferential direction is generated.

The frequency of the alternating magnetic field generated by the primary winding 12 is modulated by magnetic interaction with the magnetic materials 131 of the frequency modulation part 103. Further, the frequency of the magnetic field generated by the magnet row 102 is also modulated by magnetic interaction with the magnetic materials 131. As a result, in the frequency modulation part 103, an alternating magnetic field having a frequency P component is generated.

When an analogy to a magnetic gear wheel is taken, the situation is as follows. The magnetic gear wheel is premised to include: a first rotator in which L pairs of magnetic poles are arranged in the circumferential direction; a second rotator which is arranged in a coaxial manner relative to the first rotator and in which H pairs of magnetic poles are arranged in the circumferential direction; and a cylindrical magnetic material row arranged in a coaxial manner with a gap between the first and the second rotator. Here, when the second rotator is stationary and the first rotator is revolved, the magnetic material row arranged between the first and the second rotator revolves. This indicates that a revolving magnetic field causing the magnetic material row to revolve acts on the magnetic material row.

Thus, it is recognized that when a secondary winding corresponding to the arrangement period of the magnetic material row is provided in the magnetic material row of the magnetic gear wheel and then the magnetic material row is fixed, an alternating voltage is induced in the secondary winding.

Similarly to the embodiment, also in modification 1, frequency conversion in which high reliability is obtained, electromagnetic noise is low, and a high efficiency is obtained is allowed to be realized.

Modification 2

A frequency converter according to modification 2 has a difference from modification 1 in the point that concentrated winding is employed in the primary winding.

Figure 3:
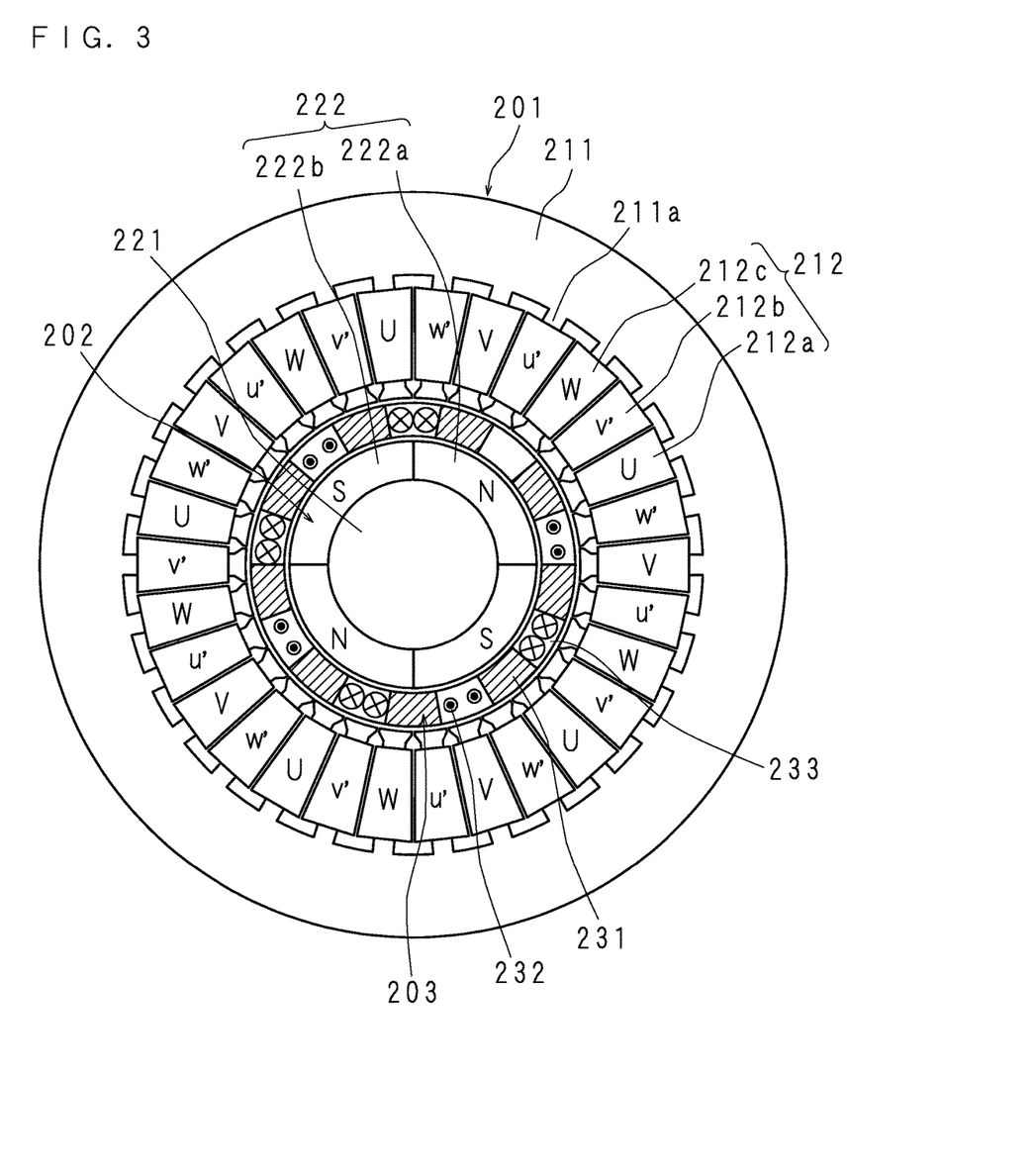
FIG. 3 is an axial sectional view illustrating an exemplary configuration of a frequency converter according to modification 2.

FIG. 3 is an axial sectional view illustrating an exemplary configuration of the frequency converter according to modification 2. The frequency converter according to modification 2 includes an alternating magnetic field generation part 201, a frequency modulation part 203, a magnet row 202, and a secondary winding 232 which are similar to those in modification 1.

The alternating magnetic field generation part 201 includes a cylindrical outer yoke 211 composed of a magnetic material. Then, in the inner peripheral surface of outer yoke 211, a plurality of teeth 211a protruding in the center direction are provided along the circumferential direction at approximately regular intervals. A primary winding 212 is wound around each teeth 211a. For example, the primary winding 212 includes: a winding 212a on which a U-phase alternating current is applied; a winding 212b on which a V-phase alternating current is applied; and a winding 212c on which a W-phase alternating current is applied. Concentrated winding is employed in each of the windings 212a, 212b, and 212c.

Similarly to modification 1, the magnet row 202 includes an inner columnar part 221. In the outer peripheral surface of the inner columnar part 221, two magnetic pole pairs 222 each provided with a magnet 222a whose outer peripheral surface side is of N pole and with a magnet 222b whose outer peripheral surface side is of S pole are arranged along the circumferential direction at approximately regular intervals.

The frequency modulation part 203 includes a plurality of magnetic materials 231 and a holding member 233 which are similar to those of modification 1. The secondary winding 232 is arranged between the magnetic materials 231 of the frequency modulation part 203 or alternatively wound around each magnetic material 231.

In modification 2, size reduction is allowed in the frequency converter in comparison with a configuration employing distributed winding. Here, description has been given for an example that concentrated winding is applied on the primary winding of the frequency converter according to modification 1. However, needless to say, concentrated winding may be applied on the primary winding of the frequency converter according to the embodiment.

Modification 3

Figure 4:
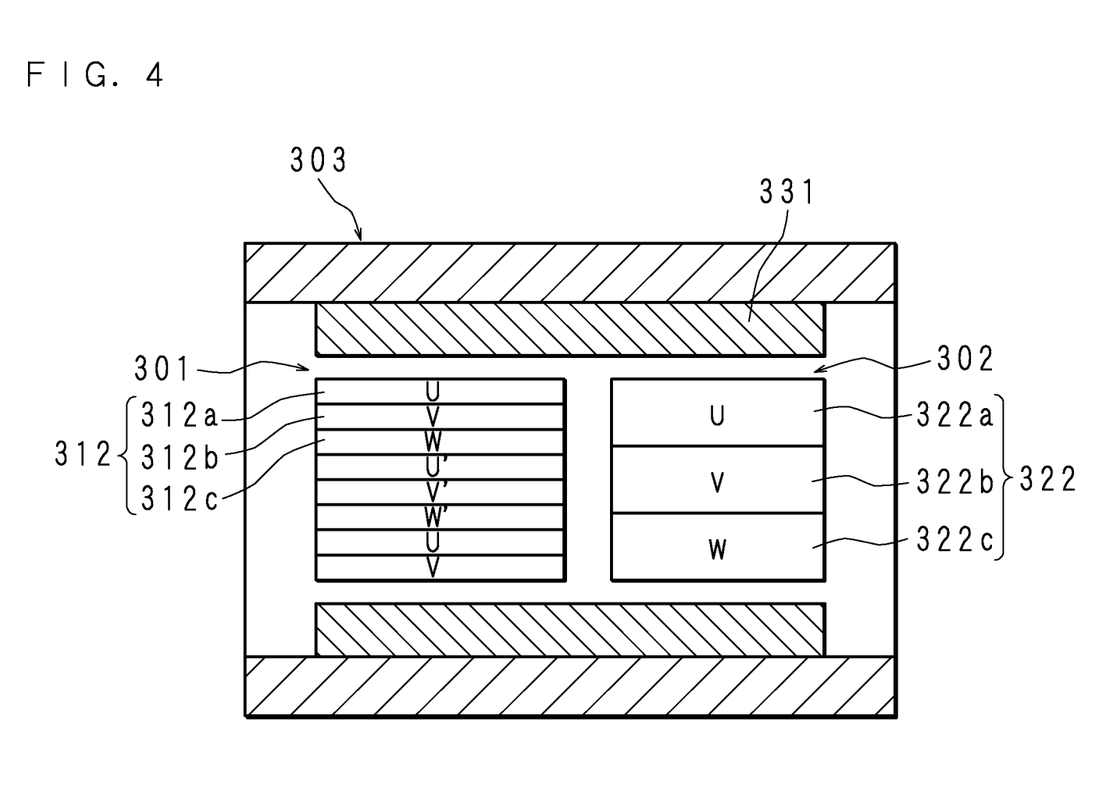
FIG. 4 is a side sectional view illustrating an exemplary configuration of a frequency converter according to modification 3.
Figure 5:
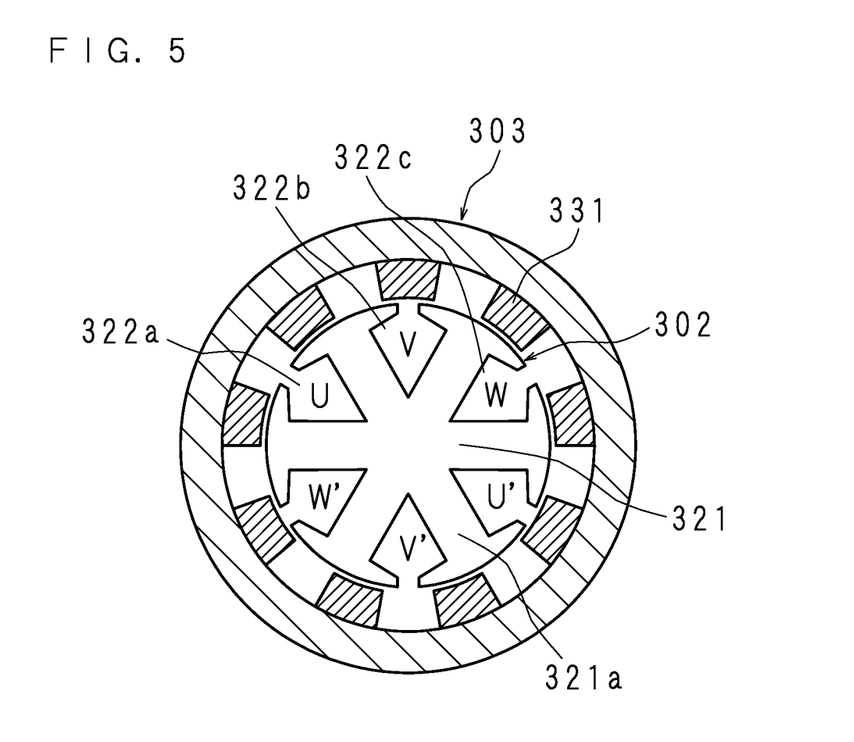
FIG. 5 is an axial sectional view illustrating an exemplary configuration of a frequency converter according to modification 3.

In a frequency converter according to modification 3, an alternating magnetic field generation part 301, an alternating current induction part 302, and a frequency modulation part 303 have different shapes and arrangement from those in the embodiment.

FIG. 4 is a side sectional view illustrating an exemplary configuration of the frequency converter according to modification 3. FIG. 5 is an axial sectional view illustrating an exemplary configuration of the frequency converter according to modification 3. The frequency converter according to modification 3 includes an alternating magnetic field generation part 301, an alternating current induction part 302, and a frequency modulation part 303 having similar functions to those of Embodiment 1.

The alternating magnetic field generation part 301 includes a column-shaped first yoke 321 composed of a magnetic material. The first yoke 321 includes a plurality of teeth protruding radially from the center part. A primary winding 312 on which a three-phase alternating voltage is applied is inserted into each slot between the individual teeth. For example, the primary winding 312 includes: a winding 312a on which a U-phase alternating current is applied; a winding 312b on which a V-phase alternating current is applied; and a winding 312c on which a W-phase alternating current is applied. Distributed winding is employed in each of the windings 312a, 312b, and 312c.

The alternating current induction part 302 includes a column-shaped second yoke composed of a magnetic material. The alternating current induction part 302 and the alternating magnetic field generation part 301 are arranged side by side such as to be opposite to each other along the center line. The second yoke has a configuration similar to the first yoke 321 and includes a plurality of teeth 321a protruding radially from the center part. A secondary winding 322 in which an alternating voltage is induced by the alternating magnetic field is inserted into each slot between the individual teeth 321a. For example, the secondary winding 322 includes: a winding 322a in which a U-phase alternating current is induced; a winding 322b in which a V-phase alternating current is induced; and a winding 322c in which a W-phase alternating current is induced. Distributed winding is employed in each of the windings 322a, 322b, and 322c.

The frequency modulation part 303 has a cylindrical shape surrounding the outer periphery of the alternating magnetic field generation part 301 and the alternating current induction part 302 and is arranged in a coaxial manner relative to the alternating magnetic field generation part 301 and the alternating current induction part 302. The frequency modulation part 303 includes a cylinder of non-magnetic metal. In the inner peripheral surface of the cylinder, as illustrated in FIGS. 4 and 5, a plurality of magnetic materials 331 are provided at regular intervals in the circumferential direction such as to surround the outer periphery of the alternating magnetic field generation part 301 and the alternating current induction part 302.

The operation of the frequency converter having this configuration is similar to that described in the embodiment. That is, the frequency of the alternating magnetic field generated by primary winding 312 is modulated by magnetic interaction with the magnetic materials 331 of the frequency modulation part 303 so that an alternating voltage is induced in the secondary winding 322.

Also in modification 3, similarly to the embodiment, windings (the primary winding 312 and the secondary winding 322) and a yoke (the frequency modulation part 303) are employed and hence a steep change in the voltage and the current is avoided. Further, no movable part is employed. Thus, frequency conversion in which high-frequency electromagnetic noise is low and high reliability is obtained is allowed to be realized.

Modification 4

Figure 6:
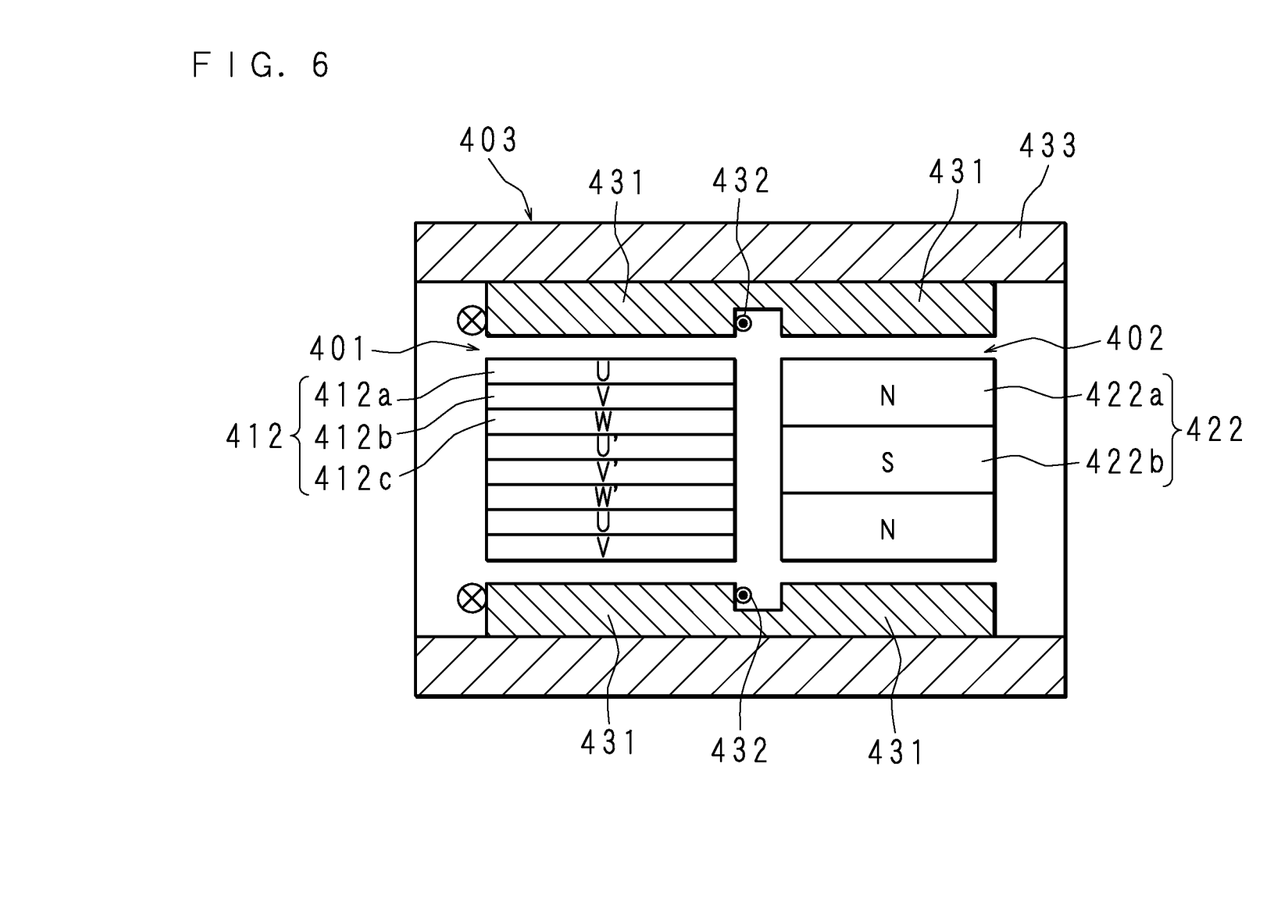
FIG. 6 is a side sectional view illustrating an exemplary configuration of a frequency converter according to modification 4.

A frequency converter according to modification 4 has a different configuration concerning the alternating current induction part 302 in modification 3.

FIG. 6 is a side sectional view illustrating an exemplary configuration of the frequency converter according to modification 4. The frequency converter according to modification 4 includes: an alternating magnetic field generation part 401 similar to that in modification 3; a column-shaped magnet row 402 arranged side by side along the center line such as to be opposite to the alternating magnetic field generation part 401; and a frequency modulation part 403.

The alternating magnetic field generation part 401 includes a primary winding 412 constructed from: a winding 412a on which a U-phase alternating current is applied; a winding 412b on which a V-phase alternating current is applied; and a winding 412c on which a W-phase alternating current is applied.

The magnet row 402 includes an inner cylinder part (not illustrated). In the outer peripheral surface of the inner cylinder part, a plurality of magnetic pole pairs 422 each including a magnet 422a whose outer peripheral surface side is of N pole and a magnet 422b whose outer peripheral surface side is of S pole which are magnetized in the thickness direction are arranged along the circumferential direction at approximately regular intervals.

The frequency modulation part 403 has a cylindrical shape surrounding the outer periphery of the alternating magnetic field generation part 401 and the magnet row 402 and is arranged in a coaxial manner relative to the alternating magnetic field generation part 401 and the magnet row 402. The frequency modulation part 403 includes a cylindrical holding member 433 of non-magnetic metal. In the inner peripheral surface of the cylindrical holding member 433, a plurality of magnetic materials 431 are provided at regular intervals in the circumferential direction such as to surround the outer periphery of the alternating magnetic field generation part 401 and the magnet row 402. The inner diameter of the magnetic materials 431 is enlarged in a portion corresponding to the gap between the alternating magnetic field generation part 401 and the magnet row 402 in comparison with the other portion. That is, the portion of the magnetic materials 431 is depressed outward in the radial direction.

The secondary winding 432 is arranged between the magnetic materials 431 opposite to the alternating magnetic field generation part 401 or alternatively wound around each magnetic material 431. That is, the configuration is such that the winding arrangement period of the secondary winding 432 agrees with the arrangement period of the magnetic materials 431. Here, description has been given for an example that the secondary winding 432 is arranged in the magnetic materials 431 opposite to the alternating magnetic field generation part 401. Instead, the secondary winding 432 may be arranged in the magnetic materials 431 opposite to the magnet row 402.

According to the frequency converter having this configuration, similarly to modifications 1 and 3, an alternating voltage having a different frequency from the polyphase alternating current applied on the primary winding 412 is induced in the secondary winding 432.

In modification 4, frequency conversion in which high reliability is obtained, electromagnetic noise is low, and a high efficiency is obtained is allowed to be realized.

Modification 5

Figure 7:
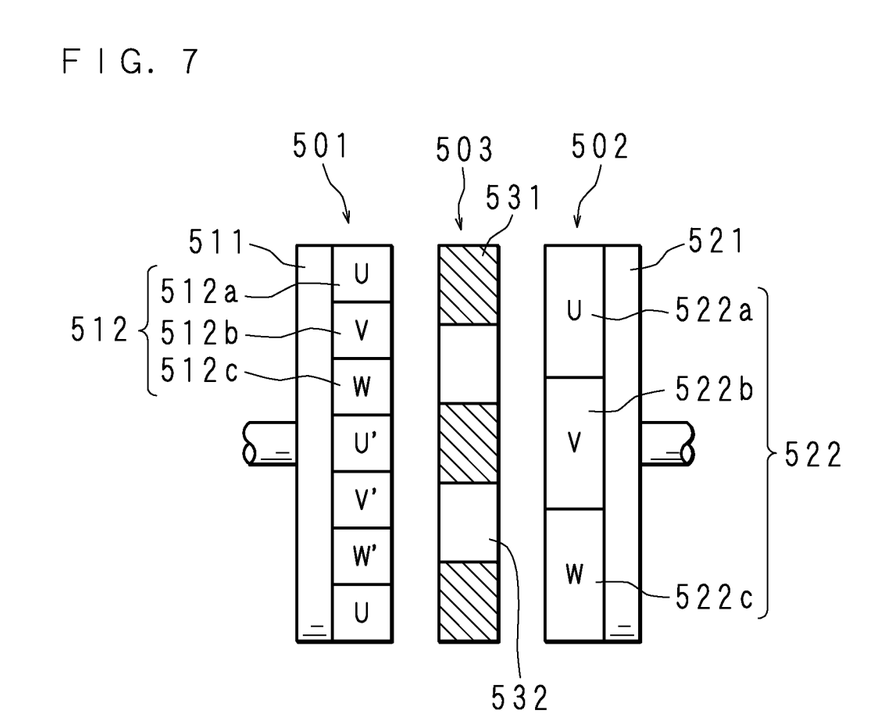
FIG. 7 is a side view illustrating an exemplary configuration of a frequency converter according to modification 5.

In a frequency converter according to modification 5, an alternating magnetic field generation part 501, an alternating current induction part 502, and a frequency modulation part 503 have different shapes and arrangement from those in the embodiment.

FIG. 7 is a side view illustrating an exemplary configuration of the frequency converter according to modification 5. The frequency converter according to modification 5 includes an alternating magnetic field generation part 501, an alternating current induction part 502, and a frequency modulation part 503 having similar functions to those of Embodiment 1.

The alternating magnetic field generation part 501 includes a disk-shaped first yoke 511 composed of a magnetic material. The first yoke 511 includes a plurality of teeth protruding from one side surface in an approximately perpendicular direction. The plurality of teeth are provided along the circumferential direction of the first yoke 511 at approximately regular intervals. A primary winding 512 in which an alternating voltage is induced by the alternating magnetic field is inserted into each slot between the individual teeth. For example, the primary winding 512 includes: a winding 512*a* on which a U-phase alternating current is applied; a winding 512*b* on which a V-phase alternating current is applied; and a winding 512*c* on which a W-phase alternating current is applied. Distributed winding is employed in each of the windings 512*a*, 512*b*, and 512*c*.

The alternating current induction part 502 includes a disk-shaped second yoke 521 composed of a magnetic material. The second yoke 521 is arranged such that the center line approximately agrees with the first yoke 511, and includes a plurality of teeth protruding from the face on the first yoke 511 side in an approximately perpendicular direction. The plurality of teeth are provided along the circumferential direction of the second yoke 521 at approximately regular intervals. A secondary winding 522 in which an alternating voltage is induced by the alternating magnetic field is inserted into each slot between the individual teeth. For example, the secondary winding 522 includes: a winding 522*a* in which a U-phase alternating current is induced; a winding 522*b* in which a V-phase alternating current is induced; and a winding 522*c* in which a W-phase alternating current is induced. Distributed winding is employed in each of the windings 522*a*, 522*b*, and 522*c*.

The frequency modulation part 503 has a disk shape and is arranged such that the center line approximately agrees. Further, the frequency modulation part 503 has a gap between the alternating magnetic field generation part 501 and the alternating current induction part 502. The frequency modulation part 503 includes a disk-shaped holding member 532 holding a plurality of magnetic materials 531. In the holding member 532, the plurality of magnetic materials 531 are arranged along the circumferential direction at approximately regular intervals. For example, the magnetic material 531 has a sector shape.

The operation of the frequency converter having this configuration is similar to that described in the embodiment. That is, the frequency of the alternating magnetic field generated by primary winding 512 is modulated by magnetic interaction with the magnetic materials 531 of the frequency modulation part 503 so that an alternating voltage is induced in the secondary winding 522.

Similarly to the embodiment, also in modification 5, frequency conversion in which high reliability is obtained, electromagnetic noise is low, and a high efficiency is obtained is allowed to be realized.

Modification 6

Figure 8:
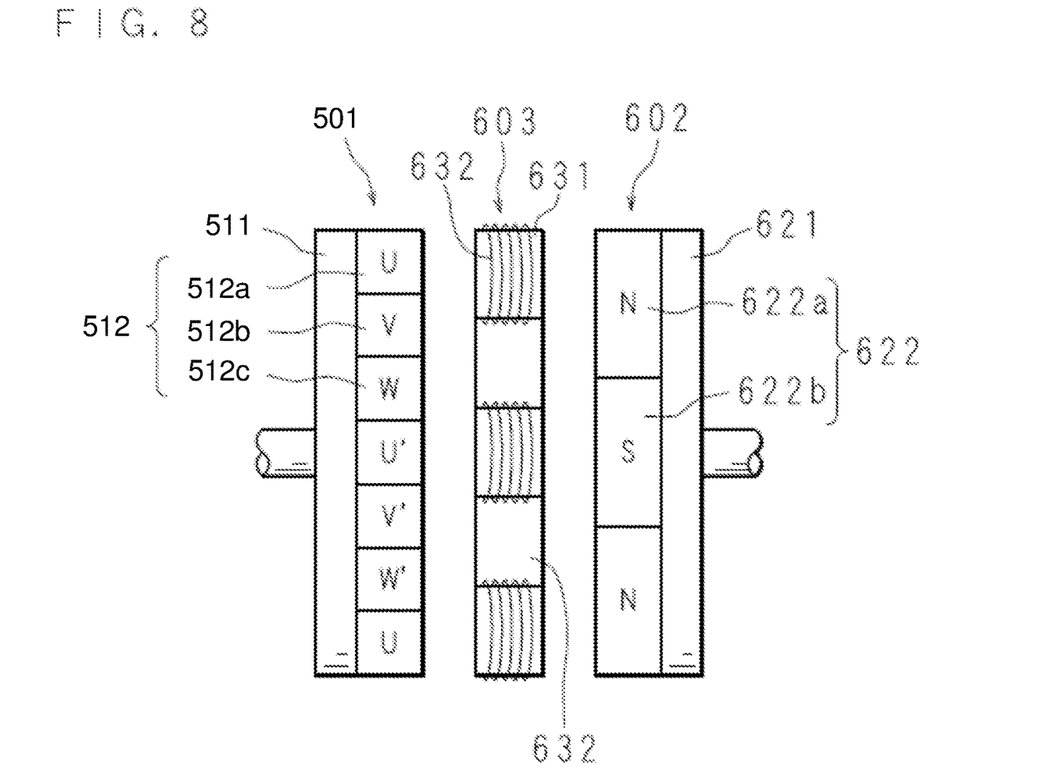
FIG. 8 is a side view illustrating an exemplary configuration of a frequency converter according to modification 6.

A frequency converter according to modification 6 has a different configuration concerning the alternating current induction part 502 in modification 5.

FIG. 8 is a side view illustrating an exemplary configuration of the frequency converter according to modification 6. The frequency converter according to modification 6 includes: an alternating magnetic field generation part 501 similar to that in modification 5; a disk-shaped magnet row 602 arranged side by side along the center line such as to be opposite to the alternating magnetic field generation part 501; and a frequency modulation part 603.

The magnet row 602 includes a disk 621 (not illustrated) composed of a magnetic material. In the disk 621 face on the first yoke 511 side, a plurality of magnetic pole pairs 622 each including a magnet 622*a* whose first yoke 511 side is of N pole and a magnet 622*b* whose first yoke 511 side is of S pole are arrangement along the circumferential direction at approximately regular intervals.

The frequency modulation part 603 has a disk shape and is arranged such that the center line approximately agrees. Further, the frequency modulation part 603 has a gap between the alternating magnetic field generation part 501 and the magnet row 602. The frequency modulation part 603 has a configuration similar to modification 5 and includes a disk-shaped holding member 632 holding a plurality of magnetic materials 631. In the holding member 632, the plurality of magnetic materials 631 are arranged along the circumferential direction at approximately regular intervals. For example, the magnetic material 631 has a sector shape.

The secondary winding 632 is arranged between the magnetic materials 631 of the frequency modulation part 603 or alternatively wound around each magnetic material 631. That is, the configuration is such that the winding arrangement period of the secondary winding 632 agrees with the arrangement period of the magnetic materials 631.

Similarly to the embodiment, also in modification 6, frequency conversion in which high reliability is obtained, electromagnetic noise is low, and a high efficiency is obtained is allowed to be realized.

It is to be recognized that the embodiment disclosed herein is illustrative at all points and is not restrictive. Further, it is intended that the scope of the present invention is defined by the claims rather than by the description given above and that all changes within the scope and the spirit of the claims are incorporated herein.

The invention claimed is:

1. A frequency converter comprising:
a first winding in which a plurality of windings on which a polyphase alternating voltage is applied are arranged approximately with equal pitch along a particular direction;
a second winding which is magnetically coupled to the first winding and in which a plurality of windings are arranged along the particular direction with different pitch from the first winding; and
a magnetic material row which is arranged on a magnetic path between the first and the second winding magnetically coupled to each other and in which a plurality of magnetic materials are arranged approximately with equal pitch along the particular direction, wherein
the first winding, the second winding and the magnetic material row are non-movable parts, and
a number of the plurality of magnetic materials in the particular direction and a number of repeated patterns of the plurality of windings of the first and the second winding are different from each other
so that an alternating voltage having a frequency different from the frequency of the polyphase alternating voltage is induced in the second winding and the second winding outputs the alternating voltage.

2. The frequency converter according to claim 1, wherein the first and the second winding and the magnetic material row satisfy the following formula, $$P = L \pm H$$

where
P: number of the plurality of magnetic materials in the particular direction,
L: number of repeated patterns of the plurality of windings of the first winding in the particular direction, and
H: number of repeated patterns of the plurality of windings of the second winding in the particular direction.

3. The frequency converter according to any one of claim 1, comprising
a cylindrical holding member holding the magnetic material row, wherein
the particular direction is a circumferential direction of the holding member and the first winding and the second winding are arranged in a manner such as to generate a periodic magnetic field along the circumferential direction.

4. The frequency converter according to claim 3, wherein the first winding and the second winding
are arranged in such a manner that a winding axis is directed to a center of the holding member.

5. The frequency converter according to any one of claim 1, comprising
a disk-shaped holding member holding the magnetic material row, wherein
the particular direction is a circumferential direction of the holding member and the first winding and the second winding are arranged in a manner such as to generate a periodic magnetic field along the circumferential direction.

6. The frequency converter according to claim 5, wherein the first winding and the second winding
are arranged in such a manner that a winding axis is approximately perpendicular to the holding member.

7. A frequency converter comprising:
a first winding in which a plurality of windings on which a polyphase alternating voltage is applied are arranged approximately with equal pitch along a particular direction;
a magnet row which is magnetically coupled to the first winding and in which a plurality of magnetic pole pairs are arranged along the particular direction with different pitch from the first winding,
a magnetic material row which is arranged on a magnetic path between the first winding and the magnet row magnetically coupled to each other and in which a plurality of magnetic materials are arranged approximately with equal pitch along the particular direction; and
a second winding in which a plurality of windings are arranged between the plurality of magnetic materials or alternatively wound around each magnetic material, wherein
the first winding, the magnet row, the magnetic material row and the second winding are non-movable parts, and
a number of the plurality of magnetic materials in the particular direction is different from a number of repeated patterns of the plurality of windings of the first winding and a number of the magnet pairs
so that an alternating voltage having a frequency different from the frequency of the polyphase alternating voltage is induced in the second winding and the second winding outputs the alternating voltage.

8. The frequency converter according to claim 7, wherein the first winding, the magnet row, and the magnetic material row satisfy the following formula, $$P = L \pm H$$

where
P: number of the plurality of magnetic materials in the particular direction,
L: number of repeated patterns of the plurality of windings of the first winding in the particular direction, and
H: number of the magnetic pole pairs of the magnet row in the particular direction.

9. The frequency converter according to any one of claim 7, comprising
a cylindrical holding member holding the magnetic material row, wherein
the particular direction is a circumferential direction of the holding member and the first winding and the second winding are arranged in a manner such as to generate a periodic magnetic field along the circumferential direction.

10. The frequency converter according to claim 9, wherein
the first winding and the second winding
are arranged in such a manner that a winding axis is directed to a center of the holding member.

11. The frequency converter according to any one of claim 7, comprising
a disk-shaped holding member holding the magnetic material row, wherein
the particular direction is a circumferential direction of the holding member and the first winding and the second winding are arranged in a manner such as to generate a periodic magnetic field along the circumferential direction.

12. The frequency converter according to claim 11, wherein the first winding and the second winding are arranged in such a manner that a winding axis is approximately perpendicular to the holding member.

13. The frequency converter according to claim 7, wherein the plurality of windings of the second winding are arranged between the plurality of magnetic materials.

14. The frequency converter according to claim 7, wherein the plurality of windings of the second winding are wound around each magnetic material.

* * * * *